Aug. 1, 1933.  A. F. POOLE  1,920,479
RECORDING METER
Filed July 21, 1931
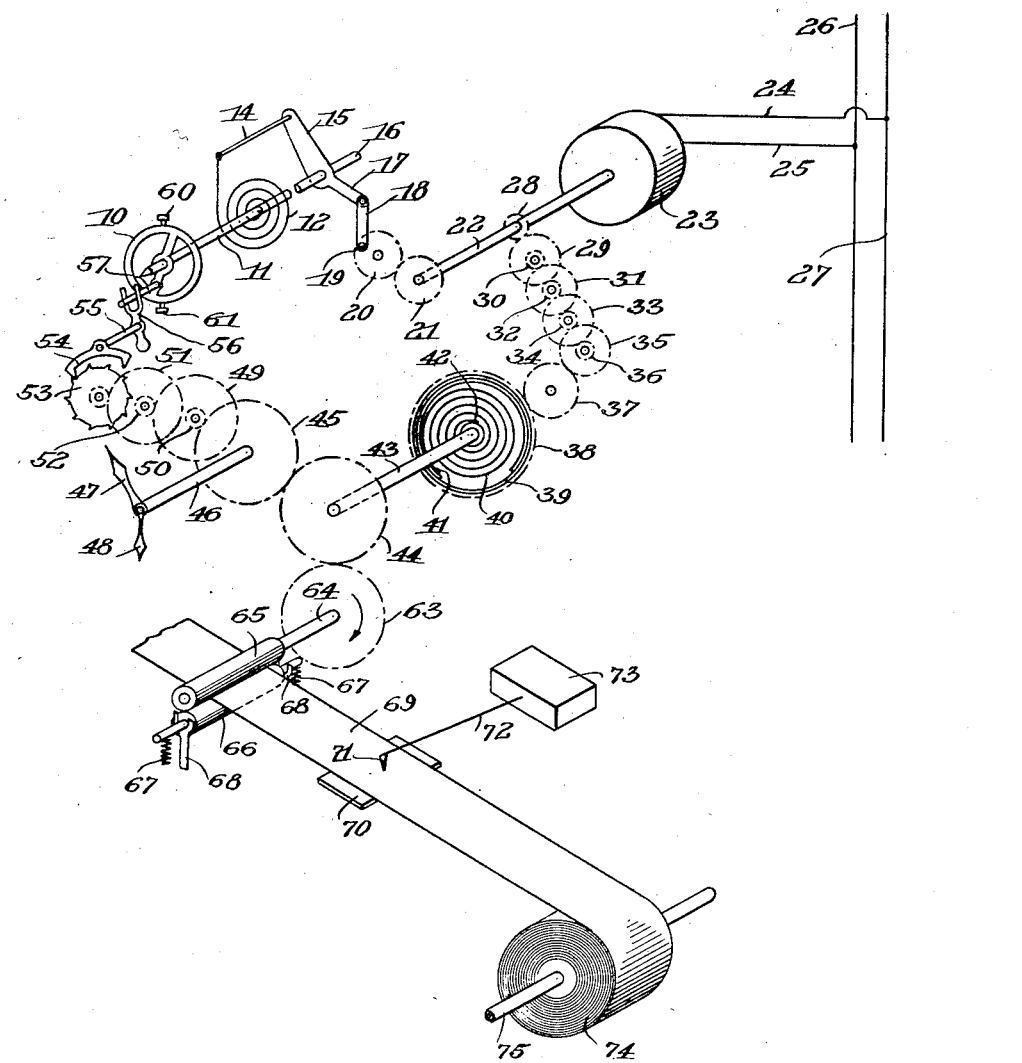
INVENTOR
Arthur F. Poole Patented Aug. 1, 1933

1,920,479

UNITED STATES PATENT OFFICE 1,920,479

RECORDING METER

Arthur F. Poole, Ithaca, N. Y.

Application July 21, 1931. Serial No. 552,183

7 Claims. (Cl. 271—2.3)

My invention is an improvement in recording meters, particularly in that class of meters which have their record sheet advanced from a regulated alternating current.

The object of my invention is to provide a meter which shall be independent of interruptions of current supply provided these are of moderate duration. A further object of my invention is to provide a paper feed for a meter which shall have sufficient power to overcome any temporary increase in load, and this without affecting the rate at which the paper is fed. Another object of my invention is to provide a paper feed for a meter which is advanced from a spring-driven motor which, in turn, is governed from a synchronous motor driven from a source of regulated alternating current; in the event the current supply is interrupted the motor will continue to drive the record sheet until the current comes on again.

The above and other objects of my invention will be apparent to those skilled in the art and will be set forth in the following specification and claims.

In a recording meter for making a continuous record of any varying quantity, there is provided some kind of means responsive to the quantity to be recorded. This measuring means is provided with a pen or some marking device which makes marks on some kind of a record sheet which is advanced proportional to the elapsed time. In the meters of the prior art, some kind of a clock movement is used to advance the record sheet; this may be a spring driven clock or a synchronous motor driven from a source of regulated alternating current. The former has the disadvantage that the driving force must be small, otherwise the timekeeping of the clock is interfered with; the latter has the drawback that if the source of current is interrupted, the record sheet stops and the meter goes out of commission until the current comes on again, with the result that the record for the period of no current is lost.

In my herein described invention I avoid the above mentioned disadvantages by driving the record sheet from a motor, preferably a clock, and governing this motor by a synchronous motor driven from a source of regulated alternating current. Thus from the fact that the motor for the record sheet is governed, I can get any desired torque for driving the record sheet without interfering with the timekeeping quality of this motor, and from the fact that the synchronous motor does not drive the record sheet, but only governs it, I get the desirable function of having the record sheet fed as usual if the current should be cut off for a short time.

My invention may be understood by reference to the accompanying drawing which shows a more of less diagrammatic view of a meter embodying my invention. Referring now to the figure I have provided a clock movement which contains a balance wheel 10 mounted on a shaft 11 rotating in the frame work. A hairspring 12 attached to the shaft 11 controls the time of vibration of the balance 10 to approximately the proper rate. The exact rate of the balance is controlled by the governing device consisting of a lever 15 in which is a pin 14 to which is attached the outer end of the hairspring. The lever 15 is mounted on a shaft 16 co-linear with the shaft 11 and rotating in the framework. The lever 15 has an arm 17 which is connected by a crank 18 to a pin 19 in a wheel 20, gearing with a wheel 21 on a shaft 22 of a self-starting synchronous motor 23 which is connected by conductors 24 and 25 to linewires 26 and 27 which supply regulated alternating current to the motor 23. The gear ratio between the motor 23 and the gear 20 is such that the gear 20 makes the same number of revolutions per minute as the balance makes beats per minute. The motion of the pin 14 will, by means of the hairspring 12, force the balance into step with it and hold it there. For instance, if the clock train presently to be described, is planned for a balance making 120 beats per minute, then the gear ratio between the motor 23 and the gear 20 is such that said gear makes 120 R. P. M. also.

The clock may be driven by a spring which is wound by the motor 23 as follows: A gear 28 on the shaft 22 drives a reducing train of gears consisting of the gear 29 engaging 28 and having a pinion 30 engaging a gear 31 on which is a pinion 32. Said pinion drives a wheel 33 on which is a pinion 34 driving a wheel 35. An idle wheel 37 drives a spring-barrel 39 by teeth 38 on the outside thereof. A driving spring 40 is in the barrel 39 and has the outside end frictionally engaging the barrel 39 by the clip 41. The inside end 42 of the spring 40 is fastened to a shaft 43 on which is a gear 44 engaging the center wheel 45 of the clock. The wheel 45 drives a pinion 50 of a third wheel 49 which drives a pinion 52 on a fourth wheel 51. The wheel 51 drives a customary escape wheel 53 which actuates a pallet 54 mounted on a shaft 55 which also carries a fork 56 engaging a roller pin 57 which keeps the balance 10 in vibration. Timing screws 60 and 61 are provided to regulate the balance 10. A shaft 46 on which the center wheel 45 is mounted serves to carry a minute hand 47. An hour hand 48 may be provided connected to the hand 47 by the usual intermediate gearing (not shown).

The clock work just described serves to keep the clock going at a rate approximately that desired, the exact rate is given by the governing device of the lever 15 and its associated mechanism. The motor 23 winds the spring 40 faster than it is unwound by the clock movement, the excess wind is taken care of by the friction clip 41. The spring is designed so as to have three to five hours run stored up ahead of the clock, if the current should go off the clock will keep on going until all the stored power of the spring has been used.

The paper feeding means consist of a gear 63 on a shaft 64 and engaging the gear 44. The shaft 64 carries a roller 65 which, by a co-operating roller 66 held in guides 68 and pressed on the roller 65 by springs 67, serves to feed the paper 69 over a platen 70 from a roll 74 mounted on a rod 75. A meter 73 controls a rod 72 on which is a pen 71 which serves to mark the record sheet 69. For the sake of clearness the meter 73 has been shown displaced 90 degrees from its position; the pin 71 moves transversely to the motion of the paper 69.

The meter 73 may be one to measure any quantity which may be desired: I have shown it in diagrammatic form since the precise meter used forms no part of my herein described invention. Further, I have shown no means of identifying time on the sheet 69. Said sheet may be properly ruled or some well-known time stamp mechanism may be used to tie up the pen indications with the hour of their making.

The advantages of my herein described invention will be evident to those skilled in the art. A large excess of driving power may be given to the spring 40 without affecting the rate of the clock, since the exact running of the clock is insured by the balance 10 being forced into step with the motor 23. Further if the current supply is temporarily cut off, the clock will take care of the record sheet during the time of interruption.

Attention is directed to my copending application No. 506,561, filed Jan. 5, 1931, in which I am claiming broadly means for bringing a clock into step with a synchronous motor.

Many changes may be made in the precise mechanism herein shown without departing from the spirit of my invention, since I claim:—

1. In a recording meter the combination of a source of regulated current, a synchronous motor connected thereto, paper feeding means, spring actuated mechanism to drive the same and means controlled by said motor to govern the speed of said driving means.

2. In a recording meter the combination of a source of regulated current, a synchronous motor connected thereto, paper feeding means, mechanism to drive the same and means controlled by said motor to govern the speed of said driving means.

3. In a recording meter the combination of a source of regulated current, a synchronous motor connected thereto, paper feeding means, a spring driven clock controlled by an escapement to drive said feeding means and means controlled by said motor to govern the speed of said escapement.

4. In a recording meter the combination of a source of regulated current, a synchronous motor connected thereto, paper feeding means, driving means for said feeding means and means to keep said driving means in step with said motor.

5. In a recording meter the combination of a source of regulated current, a synchronous motor connected thereto, paper feeding means, a spring driven clock to actuate said feeding means, a vibrating member to control the speed of said clock and means actuated by said motor to hold said vibrating member in step with said motor.

6. In a recording meter the combination of a source of regulated current, a synchronous motor driven thereby, paper feeding means, a spring driven clock to actuate said feeding means, a balance wheel to control the speed of said clock and means controlled by said motor to keep said balance wheel in step with said motor.

7. In a recording meter the combination of a source of regulated current, a synchronous motor driven thereby, paper feeding means, a spring driven clock to actuate said feeding means, a balance wheel to control the speed of said clock, a hair spring to control the time of said balance and means controlled by said motor to act on said hair spring whereby said balance is kept in step with said motor.

ARTHUR F. POOLE.